Oct. 15, 1968   J. D. ZEFF   3,405,454
WASTE MANAGEMENT SYSTEM
Filed Dec. 6, 1965   2 Sheets-Sheet 1
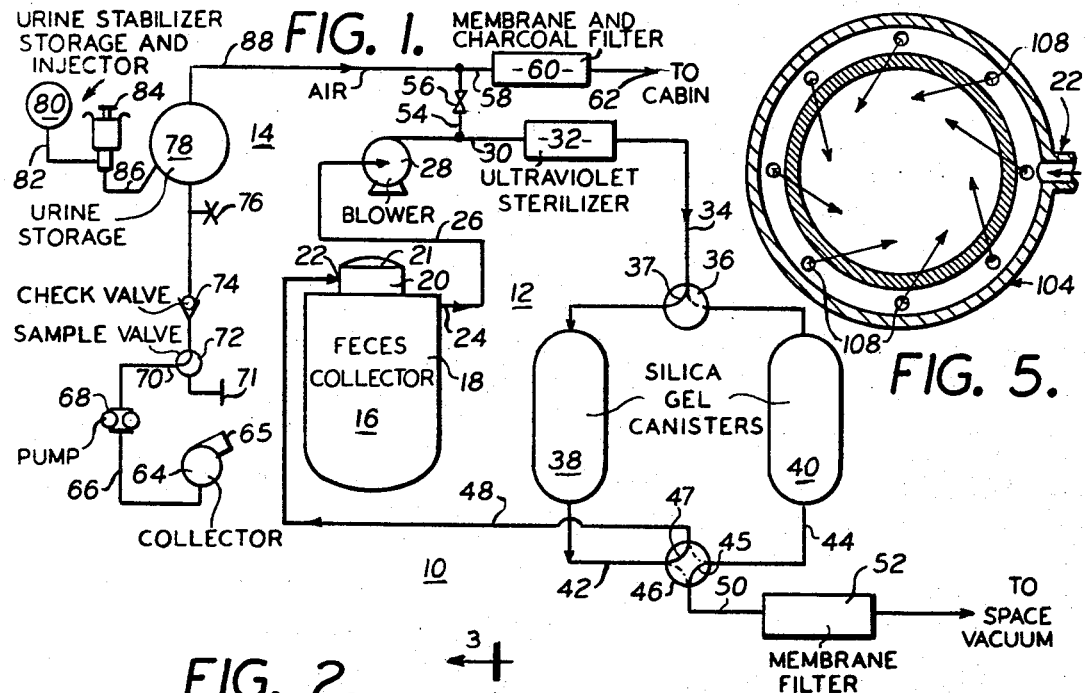
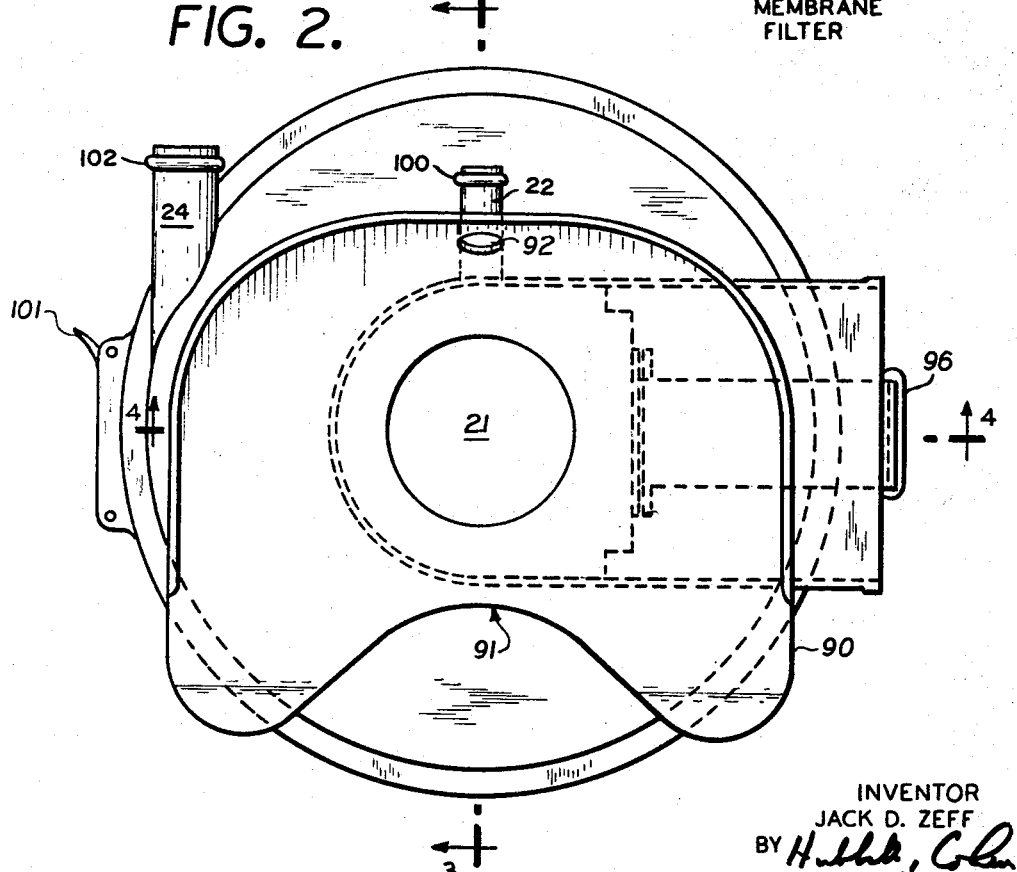
INVENTOR
JACK D. ZEFF
BY *Hubbell, Cohen,*
*Stiefel + Fiddler*
ATTORNEYS.

INVENTOR
JACK D. ZEFF
BY *Hubbell, Cohen,*
*Stiefel & Fuller*
ATTORNEYS.

United States Patent Office 3,405,454
Patented Oct. 15, 1968

3,405,454
WASTE MANAGEMENT SYSTEM
Jack D. Zeff, Spring Valley, N.Y., assignor to Arde, Inc.,
Paramus, N.J., a corporation of Delaware
Filed Dec. 6, 1965, Ser. No. 511,862
23 Claims. (Cl. 34—10)

ABSTRACT OF THE DISCLOSURE

A system for the management of human waste, capable of collecting, treating and storing urine and feces under weightless conditions and consuming a minimum of power and air is described. The feces collector employs a vortex of dried air at ambient temperature to direct the feces into the storage canister and then to dehydrate the waste stored therein.

---

This invention relates to a system for the management of human waste and particularly to a system for the collection and storage of human waste, which system is especially useful under conditions of substantial weightlessness such as might be encountered in manned space flights.

Maintenance of sanitary conditions and a comfortable atmosphere present difficult problems in any operation wherein human beings are confined to a closed vehicle for a prolonged period of time. In any such vehicle, and particularly in space vehicles, power and air are at a premium. Both are expended by discharge of materials from the vehicle. In addition, such discharge may undesirably contaminate the vehicle's surroundings. A further consideration is that on scientific expeditions such as space trips it is desirable to retain samples of human waste for scientific testing purposes. Means are therefore required for collecting and storing such waste.

When storing the waste over a prolonged period of time, it is necessary to prevent putrefaction of the waste and to maintain a clean, odor-free atmosphere in the vehicle. Additionally, space and weight are at a premium so that the waste collection and storage system must be confined to a minimum volume and kept as light as possible.

The weightlessness encountered in space flights presents the additional problem of positively directing the waste into the intended containers.

Heretofore, manned space flights have been confined to one or two man flights of relatively short duration. For such flights, rather rudimentary methods such as manual collection of feces in rubber glove devices have proved manageable, even if not entirely desirable.

The longer, more fully manned flights, such, for example, as the contemplated thirty day Apollo missions, present storage and treatment problems, as outlined above, which are not within the capabilities of the systems now in use.

With these and similar problems in mind, a number of proposals have been made for waste management systems suitable for use on manned space flights.

Past proposals for fecal storage, which requires arrest of microbiological action (which action causes putrefaction and undesirable gas production) include: addition of germicide, vacuum drying at various temperatures, radiation and hermetical sealing. While all of these methods have some value, none has proven entirely satisfactory for a system which requires minimum use of power, minimum equipment volume and weight, and prevention of loss of cabin air. In particular, while vacuum drying will accomplish the desired dehydration and consequent arrest of bacterial action, the method of the present invention has been found to involve less loss of the chemical elements of the feces, to require significantly less power and to minimize the loss of cabin air to the vehicle's surroundings.

Urine collection in space vehicles also presents special problems regarding sanitary collection means, means for separating air from the collected urine and means for treating the collected urine to arrest bacterial action.

An object of the present invention is to provide a new and improved system for the management of human waste which system is particularly adaptable for use under conditions of weightlessness.

A further object of the present invention is the provision of a human waste management system for use in a vehicle which must remain substantially sealed for long periods of time.

It is a further object of the present invention to provide a method and apparatus for the dehydration and storage of human feces.

It is also an object of the present invention to provide means for the management of human waste including fecal collection and storage means adapted to be readily used in conjunction with separate urine collection and storage means.

Still another object of the present invention is the provision of a system for the collection of human feces under conditions of weightlessness by positively directing the fecal material into a container by means of a controlled gas pattern.

Yet another object of the present invention is the provision of means for the collection and storage of human feces including means for positively directing feces from the anal opening into the desired container by gas flow and for dehydrating the collected feces with the gas used for the positive direction of the feces.

One important feature of the present invention is the means by which the feces are preserved and stored. In accordance with the present invention, the feces are at least partially dehydrated to arrest bacterial activity and to reduce feces weight and volume at the same time by air drying. While it is within the scope of the present invention to use any relatively dry gas to remove moisture from the feces, the use of cabin air is deemed to be most practical and economical.

Another important feature of the present invention is the means for the collection of feces, especially adapted for conditions of weightlessness, by use of a positively directed flow of gas, preferably in a vortex pattern, to entrain feces therein as they leave the anus and to positively direct them to, and retain them in, the desired portion of a feces collector.

Further, a particular advantageous feature of the present invention is the combination of both of the above-mentioned means at one and the same time by using the drying air or other dehydrating gas as the entraining or vortex creating gas for positive collection of the feces, whereby great efficiency is achieved.

The above and other objects, characteristics and features of the present invention will be more fully understood from the following description taken in connection with the accompanying illustrative drawings.

In the drawings:

FIG. 1 is a schematic diagram of a waste management system embodying a preferred form of the present invention;

FIG. 2 is a top plan view of the feces collector shown in FIG. 1;

FIG. 5 is a transverse sectional view of the inductor head manifold of the feces collector taken along the line 5—5 of FIG. 3.

Figure 3:
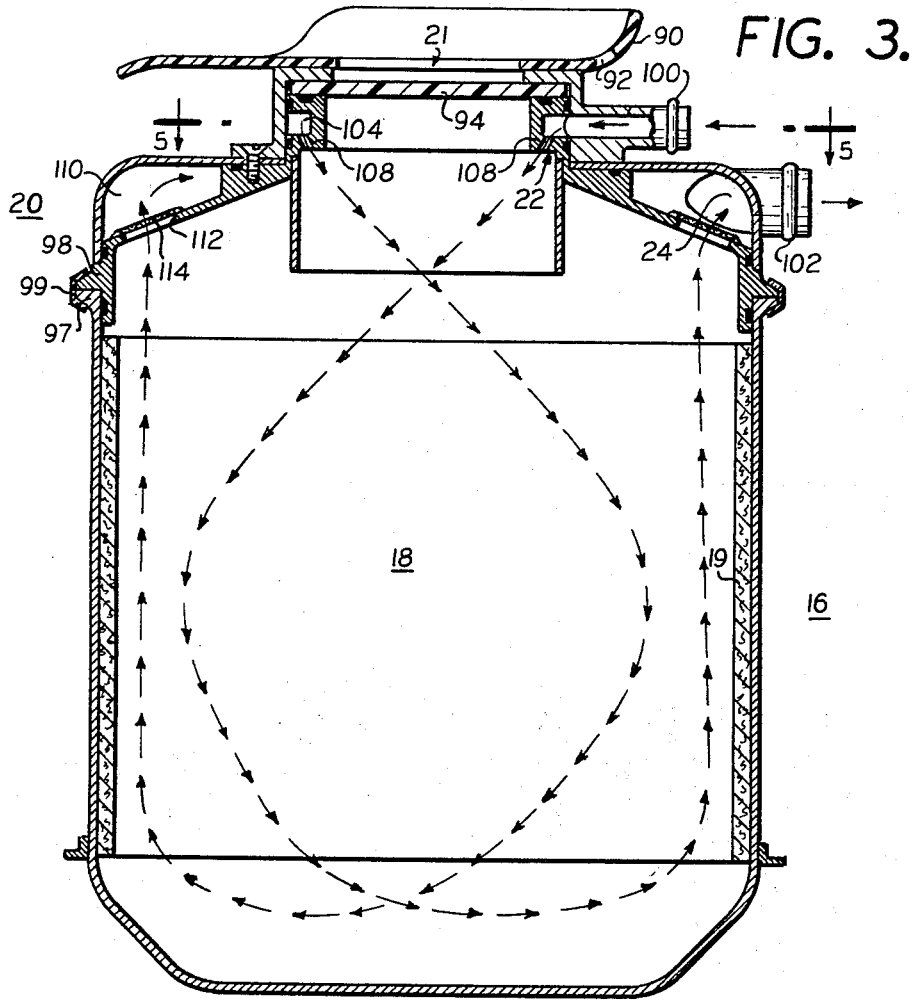
FIG. 3 is a longitudinal sectional view taken along the line 3—3 of FIG. 2.

Referring now to the drawings in detail, and with particular reference to FIG. 1, a waste management system 10 is illustrated embodying a feces collection and storage unit 12 and a urine collection and storage unit 14.

The feces collection and storage unit includes a feces collector 16, comprising a storage canister 18, an inductor head 20, an air inlet 22 and an air outlet 24. Air outlet 24 is connected by a conduit 26 to an air circulating means such as a blower 28, which in turn is selectively connected to either of a pair of drying canisters such as silica gel canisters 38 and 40 by conduits 30 and 34. Drying canisters 38 and 40 are selectively connected via conduits 42 and 44, respectively, either for recirculation to air inlet 22 through conduit 48 or for venting to space vacuum through conduit 50 to remove collected moisture therefrom by evaporation.

The selective connection to and from the drying canisters 38 and 40 is controlled by a three-way inlet valve 36 and a four-way outlet valve 46. Valves 36 and 46 can be selectively positioned, preferably by operation of a single control means, such that one of the canisters is connected to the circulating system while the other is cut off from the air circulating system and vented to space vacuum. Thus, in the illustration of FIG. 1, valve 36 is positioned such that canister 38 communicates with conduit 34 of the circulating system through passage 37 of valve 36 while valve 46 is positioned such that canister 38 communicates through conduit 42 and passage 47 of valve 46 with conduit 48 of the circulating system. At the same time, canister 40 is cut off from the circulating system by valve 36 and is vented to space vacuum through conduit 44, passage 45 of valve 46, conduit 50 and filter 52.

When it is desired to vent canister 38 to remove the collected moisture therefrom, valves 36 and 46 are operated to the positions indicated by the dotted lines in FIG. 1, whereby canister 40 communicates with conduit 34 of the circulating system through passage 37 of valve 36 and communicates through conduit 44 and passage 47 of valve 46 with conduit 48 of the system while canister 38 is now cut off from the circulating system by valve 36 and is vented to space vacuum through conduit 42, passage 45 of valve 46, conduit 50 and filter 52.

Preferably, a sterilizer such as an ultraviolet sterilizer 32 is located between conduits 30 and 34 for sterilizing the circulating air during its passage therethrough. Conduit 50 may be provided with a filter such as membrane filter 52 to sterilize the efflux and prevent loss of any drying material or other solids to the space vacuum during venting.

The feces collector unit includes provision for returning air to the vehicle environmental control system (ECS) or cabin air while the collector is in use by drawing off air through a conduit 54 which is controlled by a two-way valve 56 and is connected through a conduit 58 and a filter such as a membrane and charcoal filter 60 to a port 62 for venting to ECS. The operation and preferred construction of this feces collection and storage unit will be described in greater detail hereinafter.

Referring still to FIG. 1, in the preferred embodiment there illustrated the fecal collection and storage unit 12 may be used in conjunction with a urine collection and storage unit 14, which comprises a separate and distinct unit. Urine unit 14 is especially adapted for sanitary positive collection and storage of urine and separation of air from the collected urine. Urine unit 14 comprises a urine collector 64 connected by a conduit 66 to a pump 68. A conduit 70 connects pump 68 to a urine storage tank 78 through a three-way sample valve 72, a check valve 74 and a control valve 76.

The illustrated urine storage and collection unit includes provision for injecting a chemical stabilizer into urine storage tank 78 from a chemical stabilizer storage tank 80 through a pair of conduits 82 and 86 by operation of stabilizer injector 84. Any suitable chemical urine stabilizer, such as, e.g., copper sulfate, chromic acid or potassium persulfate may be used. A conduit 88 connects with conduit 58 for venting of air from urine storage tank 78 through filter 60 and port 62 to the environmental control system.

As shown in FIG. 1, the fecal and urine systems are independent except that the air separated and vented from the urine storage system is routed along with air vented from the fecal system through the filter 60 to the ECS. Manifestly, the fecal and urine units may be made wholly independent by simply providing a separate filter for venting the air from line 88 to the ECS. Further, any other suitable urine system may be used instead of the illustrated urine unit 14.

The illustrated urine unit 14 may be suitably mounted to the wall of the vehicle. In use, urine collector 64 is removed from a suitable wall bracket and conveniently positioned about 1 to 2 inches away from the user and urination is begun. The urine collector 64 conveniently has a capacity of about 400 ml., which is considered about an average micturition. It may be constructed of any suitable material but is preferably made of translucent plastic to permit visual inspection and control. In the preferred embodiment, urine entering urine collector 64 is directed inwardly from the receiving opening 65 toward the opposite end of the urine collector by virtue of inward and tangential velocity components imparted to the urine by a vortex tube (not shown) designed into the urine collector. The tangential velocity component induces a radial body force field which promotes removal of any entrained gases from the urine. A cylindrical surface-tension baffle (not shown) is fastened to the end of the urine collector towards which the urine is directed and operates both to stabilize the liquid-vapor interface and to insure the presence of liquid at the suction of the urine transfer pump 68.

Conduit 66 is ported into a fixed end of the baffle, and a switch is provided for the operator to control the pump operation. When the micturition is completed, or upon the earlier filling of the collector, the operator turns on the pump and the urine is drawn through conduit 66, pump 68 and conduit 70 to urine storage tank 78. Check valve 74 prevents reverse flow of the urine when the pump is turned off.

Urine sampling for inflight analysis is readily accomplished by positioning three-way sample valve 72 so that the urine flow is diverted into a sampling bag attached to a discharge port 71. When the desired sample volume has been withdrawn, the valve is returned to its normal position, allowing the urine to be pumped to storage tank 78.

Chemical stabilizer is stored in stabilizer storage tank 80 which is made of stainless steel or other suitable material and is preferably equipped with a surface-tension baffle to control fluid position in a zero gravity field. The preferred stabilizer-injector 84 is a Manostat Corporation Man-O-Pat valve, although any suitable injector may be used. Typically, 10 ml. of stabilizer is adequate for stabilizing an average micturition. Accordingly, the injector 84 is preset for 10 ml. per injection and is activated after each micturition to inject the desired amount of stabilizer from tank 80 into tank 78 through conduit 82 and 86.

Urine storage tank 78 is preferably constructed of translucent plastic and is provided with a surface tension baffle entrained air not removed from the urine by collector 64. Air is vented from urine storage tank 78 through conduit 88.

Fecal collection and storage is accomplished in accordance with the preferred embodiment illustrated schmatically in FIG. 1 and in FIGS. 2–5 as follows. The user seats himself on the saddle 90 atop the inductor head 20 of collector 16 and activates blower 28. Dry air is drawn into the inductor head 20 through inlet 22 in a manifold to be described in greater detail hereinafter, in such manner as to effect inductor action by means of an air vortex created in the immediate vicinity of an anal port 21 which is in register with the anus of the user.

The path of the air vortex is shown generally by the broken line of arrows in FIG. 3. As the user defecates, the feces are entrained in the air vortex and positively directed toward the end of the storage canister 18 which is remote from the anal port. The dry air carrying and circulating around the feces absorbs moisture therefrom. The air flows in the vortex pattern to the remote end of the canister and then returns to the inductor head at a greatly reduced velocity along the side of the canister. The moisture laden air is discharged from the inductor head through outlet 24 and circulated by blower 28 through conduits 26 and 30 to the ultraviolet sterilizer 32.

From sterilizer 32 the moisture laden air passes through conduit 34 and is directed by valve 36 to one of the moisture absorbing canisters 38 and 40 where moisture is withdrawn from the air. The dew point of the air discharged from the canister may be as low as about −90° F. The dried air is recirculated to inlet 22 through conduit 42 or 44, depending on whether canister 38 or 40 was employed, and then passes through valve 46 and conduit 48. Circulation of the drying air is continued until the desired degree of fecal dehydration is effected. In the contemplated embodiment, a satisfactory degree of dehydration of an average defecation will take about two hours.

The two moisture absorbing canisters 38 and 40 may be constructed of any suitable material and may contain any suitable moisture absorbent. In the contemplated preferred embodiment the canisters are made of Teflon coated aluminum, and packed with silica gel as the moisture absorebnt. The silica gel is retained at each end with a stainless steel screen and support bridge, one end being spring loaded to keep the contents compacted.

When the moisture absorbing capacity of canister 38 has been exhausted, valves 36 and 46 are adjusted to direct the moisture laden air in conduit 34 to canister 40 and to connect conduit 44 with dry air return conduit 48. At the same time, conduit 42 is connected through valve 46 to conduit 50 for venting to space vacuum, whereby the moisture is evaporated from canister 38 and the canister's moisture absorbing capacity is regenerated. As already mentioned, valves 36 and 46 may be conveniently operated by a single control means for simultaneous action. These valves can be Teflon-coated plug valves, e.g., Modified Republic Series 8500.

In the illustrated embodiment, conduit 50 is provided with a membrane filter 52, which sterilizes the efflux. A suitable filter element is a Pall Corporation Ultipore #15 providing 2.5 square feet of filtering surface with an absolute removal of .015 micron particles when filtering gas as in this application. The filter is conveniently housed in a special Teflon-coated aluminum canister adapted for changing the element and for use under one atmosphere external pressure.

In this manner dehydration of the feces is effected without the need for generating heat and with minimum power consumption. The only cabin air loss, which occurs during regeneration of the silica gel, is of such a slight amount as to present no serious problem. For example, for a four man 30 day mission the total loss of cabin air would be only about 0.3 pound. Moreover, such regeneration requires no heat or power.

In addition to the closed dehydration loop described above, the feces processing system includes means for by-passing air to the vehicle ECS, since when the collector is in use the inductor action draws some cabin air into the feces collector at the user's anterior and posterior body contours. The air is drawn off through conduit 54 which is controlled by a two-way valve 56. The air passes to a membrane and charcoal filter 60 where it is sterilized and deodorized and then returned to the vehicle ECS through port 62. The preferred filter is a Pall Corporation Petrosorb-Ultipore which combines activated charcoal with the Ultipore membrane filter previously described. Both of these filters have a minimum operating life of 120 man-days.

The presently preferred form of feces collector is illustrated in detail in FIGS. 2 to 5. The waste collection head 20 of fecal collector 16 includes a saddle 90, preferably molded of fiberglass, to fit the seated human form in order to place the user over anal port 21. As is shown in FIG. 2, the forward portion of the saddle is splayed as at 91 to facilitate concurrent use of the urine collector 64. The saddle also includes a posterior vent 92. Inwardly of the saddle is a slidably disposed valve 94 which is connected to control lever 96 for sealing anal port 21 when the collector is not in use. The valve is preferably made of plastic. The remainder of the inductor head is preferably aluminum. The splayed portion of the saddle, as well as the posterior vent 92 permit induction of some cabin air into the system when the system is in operation and plastic closure valve 94 is open.

Figure 4:
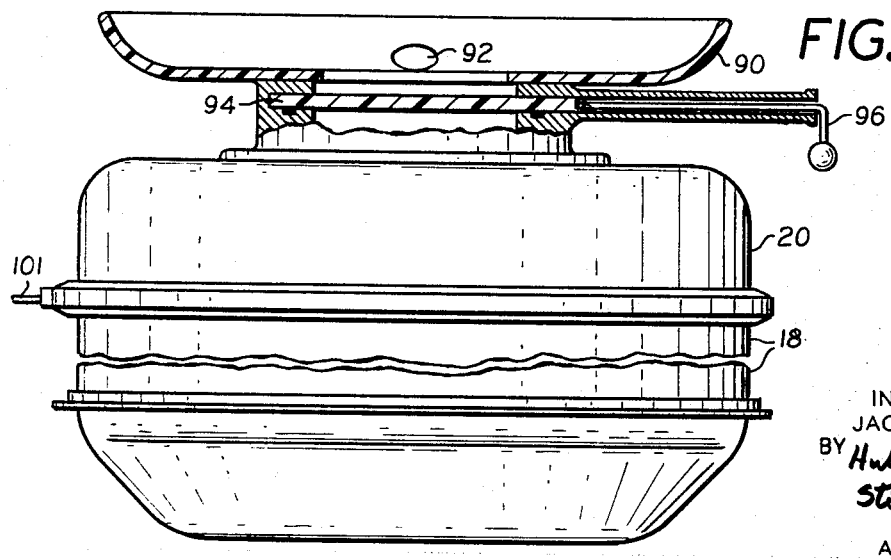
FIG. 4 is a longitudinal sectional view taken along the line 4—4 of FIG. 2.

Storage canister 18 is, in the contemplated preferred embodiment, made of aluminum, coated on the inside with Teflon, and lined with felt 19 or other absorbent material to enhance drying of the feces. Canister 18 is connected to inductor head 20 by means which facilitate rapid removal of a full canister and replacement thereof with an empty one. The preferred means connecting canister 18 to inductor head 20 is illustrated in FIGS. 2–4 and comprises a concave circular hoop 99 which firmly embraces a pair of abutting flanges 97 and 98 on canister 18 and inductor head 20, respectively. The diameter of hoop 99 may be enlarged to disengage it from flanges 97 and 98 by operation of an over-center latch 101. Of course, other connecting means can be employed herein. The removed canister can then be sealed and stored.

Alternatively, it may sometimes be preferable to replace the entire feces collector 16 including saddle 90 and inductor head 20 when the canister is full. This can be accomplished in a particularly quick and efficient manner by means of quick disconnect couplings at the gas inlet 22 and outlet 24. This feature is illustrated in FIG. 3, wherein the connection between inlet 22 and conduit 48 comprises quick disconnect coupling 100 and the connection between outlet 24 and conduit 26 comprises quick disconnect coupling 102. When this alternative feature is employed, change-over is effected by merely slidably disconnecting couplings 100 and 102 from the inlet and outlet of the used collector 16 and inserting the couplings 100 and 102 into the inlet 22 and outlet 24 respectively of a new collector. Quick disconnect valves or other closure means (not shown) may be provided for sealing inlet 22 and outlet 24 upon removal of the collector.

As previously stated, the present invention includes a means of employing the drying air as the means for providing a directing force for collection of the fecal material. This is accomplished by introducing the drying air into the collector in a pattern which will bias the material towards the closed end of the collector. The preferred pattern for accomplishing this end is a vortex pattern. As is well known, when a fluid moves from one zone to another in a vortex or swirling pattern, a biasing force results in a direction from said one zone to the other along the longitudinal axis of the vortex. It is this force which will cause the fecal material entering the collector through the opening 21 to move toward the closed end of the collector. At the same time the air providing this biasing force will intimately mix with the fecal material and pick up moisture therefrom to dehydrate the material.

FIGS. 3 and 5 illustrate the presently preferred means of producing a vortex pattern for the drying air so as to accomplish the directive result from the introduction of the air as well as to obtain a dehydration effect therefrom. Referring now to FIGS. 3 and 5, it will be seen that the inductor head 20 includes an annular inlet manifold 104 which is fed through the inlet 22. In order to distribute air around the opening for reception of the fecal material a plurality of obliquely directed openings 108 are provided in the bottom of the manifold. These openings will permit the drying air in the manifold to escape in oblique jets illustrated in FIGS. 3 and 5 by arrows. The obliquely directed openings will present the swirling vortex pattern.

Also provided in the inductor head 20 is an exit or exhaust manifold 110 which is annular in configuration and which extends around the periphery of the inductor head concentrically with the intake manifold 104. The exhaust manifold 110 has a multiplicity of openings 112 to permit the air after leaving the vortex pattern to move out therethrough and into the exhaust manifold. Preferably the exhaust manifold 110 is of greater diameter than intake manifold 104 so that the openings 112 may be located outwardly of inlet openings 108 in order to avoid gas being exhausted from the collector from interfering with the vortex pattern. Overlying the openings 112 are suitable filters 114 to prevent the passage of solid material therethrough. The exhaust manifold 110 communicates with the outlet 24 from which the air, now laden with moisture, passes out of the collector and through the various conduits for drying and recirculation back to the collector through the intake manifold 104.

It will be understood that air drying of the fecal material could be employed in combination with other means for collecting the material in the container such as, for example, manual means. Likewise, the vortex type collection means illustrated in FIGS. 3 and 5 and described hereinbefore could be employed in combination with other forms of drying such as vacuum drying. That is to say, an air vortex could be created during the time of defecation by the user to collect the material in a container. After such collection has been effected, the means for creating the vortex could be deactivated, the container could then be sealed from the ECS and vented to vacuum for the purpose of dehydrating the material in the container. However, decided advantages flow from utilizing both air drying and air vortex collection in view of the fact that the same means for accomplishing the one end accomplishes the other whereby to give rise to an economical, substantially loss-free, low power consuming collection and dehydration system.

For purposes of biomedical analysis, it may be required to sample and analyze feces periodically after collection and storage. The analyses may be conducted either in flight or post flight.

Feces sample collection for in-flight analysis may be effected in the contemplated system by means of a pliable plastic sample collection receptacle (not shown). In operation, the sample collection receptacle is placed in position inwardly of the seat 90 and affixed to a hollow rigid ring (not shown) fitted with peripheral jets. An air line provided with the receptacle is connected with inlet 22 and the drying air stream is diverted by means of a three-way valve (not shown) into the rigid ring and through the jets. The air leaves the receptacle through a hole provided therein and enters canister 18 wherefrom it is recirculated in the manner described above in connection with FIG. 1. When sampling is completed the three-way valve is returned to its normal position. Excess excreta may be squeezed out into canister 18 through the hole in the receptacle. The receptacle is then removed, covered, and placed in a sealed plastic bag for later analysis.

While the preceding illustrative discussion of the invention has been with reference to a space vehicle, it will be understood that the present invention can be used in many other applications, including airplanes, railroad trains and the like. Of course, reference to "space vacuum" throughout the present description is merely illustrative and may be taken more broadly to refer to the particular surroundings of the vehicle or other structure in which the waste management system of the present invention is employed.

While I have herein shown and described several forms of the present invention and have suggested various modifications therein, other changes and modifications may be made therein within the scope of the appended claims without departing from the spirit and scope of this invention.

What I claim is:

1. A method of dehydrating fecal material under zero gravity conditions, said method comprising collecting said material in a container, introducing a drying gas at ambient temperature into said container, contacting said drying gas with said fecal material to remove moisture from said material and removing the moisture laden gas from said container.

2. The method according to claim 1 which further includes drying said removed moisture laden gas and recirculating said dried gas to said container.

3. The method according to claim 1 wherein said drying gas comprises the atmosphere of a vehicle in which said method is performed.

4. The method according to claim 1 wherein said container has a fecal material inlet and an opposite end, said method further including the steps of establishing a gas flow pattern adjacent said inlet for creating a biasing force toward said opposite end, and introducing said fecal material into said flow pattern through said inlet.

5. The method according to claim 4 wherein said gas flow pattern is a vortex.

6. The method of collecting fecal material under zero gravity conditions in a container having a fecal material inlet and an opposite end, said method comprising the steps of establishing a gas flow pattern adjacent said inlet for creating a biasing force toward said opposite end, and introducing said material into said flow pattern through said inlet.

7. The method according to claim 6 wherein said gas flow pattern is a vortex.

8. The method according to claim 6 wherein said gas comprises the atmosphere of a vehicle in which said method is performed.

9. The method of claim 6, further comprising the step of contacting said collected material with the gas of said gas flow pattern to remove moisture from said material.

10. The method of claim 6, further comprising the steps of maintaining said collected material at said opposite end by continuing said gas flow pattern after collection of said material, and contacting said collected material with the gas of said gas flow pattern to remove moisture from said material.

11. The method according to claim 10, wherein said gas comprises the atmosphere of a vehicle in which said method is performed.

12. The method according to claim 10, which further includes drying said removed moisture laden gas and recirculating said dried gas to said container.

13. Apparatus for treating fecal material under zero gravity conditions, said apparatus comprising a container having a port for receiving said material on one end thereof and an opposite end, a gas inlet and a gas outlet, and means for introducing a drying gas at ambient temperature into said container through said inlet for dehydrating said material.

14. Apparatus according to claim 13 further comprising gas dehydrating means connected with said gas outlet for dehydrating gas passing therethrough, and conduit means connecting said gas dehydrating means to said inlet whereby to recirculate dehydrated gas for reuse as the drying gas.

15. Apparatus according to claim 14 further comprising means for closing said port.

16. Apparatus according to claim 14 wherein said gas dehydrating means further comprises means for intermittently venting said gas dehydrating means to remove collected moisture therefrom.

17. Apparatus according to claim 14 wherein said gas dehydrating means comprises a pair of gas dehydrating chambers, means for venting said pair of gas dehydrating chambers, and valve means for selectively alternately connecting one of said pair of dehydrating chambers to said gas outlet and to said conduit means and the other of said pair of chambers to said venting means, whereby while one of said pair of dehydrating chambers is removing moisture from said gas, the other chamber is vented to remove the moisture therefrom.

18. Apparatus according to claim 13 further comprising means for establishing a gas flow pattern away from said port toward said opposite end.

19. Apparatus for the collection of fecal material especially adapted for use under conditions of substantial weightlessness, said apparatus comprising a feces collector having waste inlet means at one end thereof and an opposite end, and means for establishing a gas flow pattern away from said waste inlet means toward said opposite end.

20. Apparatus according to claim 19 wherein said means for establishing said gas flow pattern comprises vortex creating means.

21. Apparatus according to claim 20 wherein said vortex creating means comprises an annular manifold in register with said waste inlet means and having a plurality of openings directed toward said opposite end of said collector in a direction both non-radially of said manifod and at an angle to the central axis thereof.

22. Apparatus according to claim 19 wherein said means for establishing said gas flow pattern comprises a gas inlet means and an annular intake manifold in communication with said gas inlet means and in register with said waste inlet means, said intake manifold having a plurality of openings directed toward said opposite end of said collector in a direction both non-radially of said manifold and at an angle to the central axis thereof, said apparatus further comprising gas outlet means and an annular exhaust manifold in communication with said gas outlet means, said exhaust manifold being of greater diameter than said intake manifold and concentric therewith, and said exhaust manifold further having at least one opening in communication with said collector.

23. Apparatus according to claim 21, wherein said waste means comprises a seat having an aperture therein.

References Cited

UNITED STATES PATENTS

| 790,162 | 5/1905 | Trump | 34—57 |
| 1,541,147 | 6/1925 | Ikeda et al. | 34—80 |
| 1,818,586 | 8/1931 | Schumacher | 4—131 |
| 2,368,699 | 2/1945 | Arnold | 34—10 |
| 2,565,720 | 8/1951 | Collison et al. | 4—131 |
| 2,749,558 | 6/1956 | Lent et al. | 4—10 |
| 2,783,547 | 3/1957 | Bieger et al. | 34—80 X |
| 2,884,855 | 5/1959 | Koch | 34—80 X |
| 3,034,131 | 5/1962 | Lent | 4—1 X |
| 3,073,040 | 1/1963 | Schueller | 244—1 X |

JAMES W. WESTHAVER, *Primary Examiner.*

A. D. HERRMANN, *Assistant Examiner.*